(12) United States Patent
Komiyama et al.

(10) Patent No.: US 7,718,314 B2
(45) Date of Patent: May 18, 2010

(54) CATHODE MATERIAL AND BATTERY

(75) Inventors: Michiko Komiyama, Tokyo (JP); Ken Segawa, Fukushima (JP); Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 11/366,127

(22) Filed: Mar. 2, 2006

(65) Prior Publication Data

US 2006/0216601 A1    Sep. 28, 2006

(30) Foreign Application Priority Data

Mar. 9, 2005    (JP)    ............... P2005-066406

(51) Int. Cl.
*H01M 4/50*    (2006.01)
*H01M 4/52*    (2006.01)
*H01M 4/58*    (2006.01)

(52) U.S. Cl. .............. 429/221; 429/220; 429/223; 429/224; 429/231.1; 429/231.3; 429/231.6; 252/182.1

(58) Field of Classification Search ........... 429/220, 429/221, 223, 224, 231.1, 231.3, 231.5, 231.6; 252/182.1
See application file for complete search history.

(56) References Cited

U.S. PATENT DOCUMENTS

| 6,746,800 B1 * | 6/2004 | Sunagawa et al. ......... 429/231.1 |
| 6,797,430 B1 * | 9/2004 | Hatta et al. ........... 429/231.1 X |
| 2006/0093917 A1 * | 5/2006 | Howard et al. .......... 429/223 X |
| 2007/0072075 A1 * | 3/2007 | Gan et al. ............ 429/231.5 X |

FOREIGN PATENT DOCUMENTS

| JP | 2002-042816 | 2/2002 |
| JP | 2004-087299 | 3/2004 |

* cited by examiner

*Primary Examiner*—Stephen J. Kalafut
(74) *Attorney, Agent, or Firm*—Sonnenschein Nath & Rosenthal LLP

(57) ABSTRACT

A cathode material capable of improving capacity and superior low temperature characteristics, and a battery using the cathode material are provided. A cathode and an anode are layered with an electrolyte layer and a separator in between. The cathode contains a complex oxide containing lithium, manganese, nickel, and cobalt; a complex oxide containing lithium and at least one of nickel and cobalt; and a complex oxide containing lithium and manganese and having a spinel structure or a phosphorus oxide containing lithium and iron at a given ratio.

11 Claims, 9 Drawing Sheets

CATHODE MATERIAL AND BATTERY

CROSS REFERENCES TO RELATED APPLICATIONS

The present invention contains subject matter related to Japanese Patent Application JP 2005-66406 filed in the Japanese Patent Office on Mar. 9, 2005, the entire contents of which being incorporated herein by reference.

BACKGROUND OF THE INVENTION

1. Field of the Invention

The present invention relates to a cathode material in which a plurality of cathode active materials are mixed and a battery using the cathode material.

2. Description of the Related Art

In recent years, portable electronic devices such as a notebook personal computer, a combination camera (videotape recorder), and a mobile phone have been introduced one after another, and their size and weight have been reduced. Accordingly, secondary batteries as a portable power source have been highlighted, and active researches for obtaining a higher energy density have been implemented. Under such circumstances, as a secondary battery having a high energy density, lithium ion secondary batteries have been in practical use.

In such lithium ion secondary batteries, for example, it is proposed that in order to improve the battery characteristics such as a capacity and cycle characteristics, as a cathode active material, two kinds of complex oxides containing lithium (Li), manganese (Mn), nickel (Ni) or cobalt (Co) and the like are mixed (for example, refer to Japanese Unexamined Patent Application Publication No. 2003-173776).

SUMMARY OF THE INVENTION

However, in the foregoing secondary battery, the low temperature characteristics are not sufficient, and further improvement has been demanded.

In view of the foregoing, in the present invention, it is desirable to provide a cathode material capable of improving capacity and low temperature characteristics, and a battery using the cathode material.

According to an embodiment of the present invention, there is provided a cathode material containing a first cathode active material, a second cathode active material, and a third cathode active material, in which the first cathode active material is a complex oxide containing lithium, manganese, nickel, and cobalt, the second cathode active material is a complex oxide containing lithium and at least one of nickel and cobalt, the third cathode active material is at least one of a complex oxide containing lithium and manganese and having a spinel structure and a phosphorus oxide containing lithium and iron (Fe), and a ratio by the weight ratio of the cathode active materials is a value in the range obtained by joining each dot of A, B, C, and D expressed in Mathematical formula 1, where the first cathode active material is x, the second cathode active material is y, and the third cathode active material is z in a ternary diagram with the apexes set to each cathode active material.

$$A(x,y,z)=(0.76,0.04,0.20)$$
$$B(x,y,z)=(0.94,0.05,0.01)$$
$$C(x,y,z)=(0.05,0.94,0.01)$$
$$D(x,y,z)=(0.04,0.76,0.20) \quad \text{(Mathematical formula 1)}$$

According to an embodiment of the present invention, there is provided a battery including a cathode, an anode, and an electrolyte, in which the cathode contains a first cathode active material, a second cathode active material, and a third cathode active material, the first cathode active material is a complex oxide containing lithium, manganese, nickel, and cobalt, the second cathode active material is a complex oxide containing lithium and at least one of nickel and cobalt, the third cathode active material is at least one of a complex oxide containing lithium and manganese and having a spinel structure and a phosphorus oxide containing lithium and iron, and a ratio by the weight ratio of the cathode active materials is a value in the range obtained by joining each dot of A, B, C, and D expressed in Mathematical formula 1, where the first cathode active material is x, the second cathode active material is y, and the third cathode active material is z in a ternary diagram with the apexes set to each cathode active material.

$$A(x,y,z)=(0.76,0.04,0.20)$$
$$B(x,y,z)=(0.94,0.05,0.01)$$
$$C(x,y,z)=(0.05,0.94,0.01)$$
$$D(x,y,z)=(0.04,0.76,0.20) \quad \text{(Mathematical formula 1)}$$

According to the cathode material and the battery of the embodiment of the present invention, the first cathode active material, the second cathode active material, and the third cathode active material are contained, and the ratio by the weight ratio of the cathode active materials is the value in the range obtained by joining each dot of A, B, C, and D expressed in Mathematical formula 1. Therefore, the capacity and the low temperature characteristics can be improved.

Other and further objects, features and advantages of the invention will appear more fully from the following description.

DETAILED DESCRIPTION OF THE PREFERRED EMBODIMENT

An embodiment of the present invention will be hereinafter described in detail with reference to the drawings.

Figure 1:
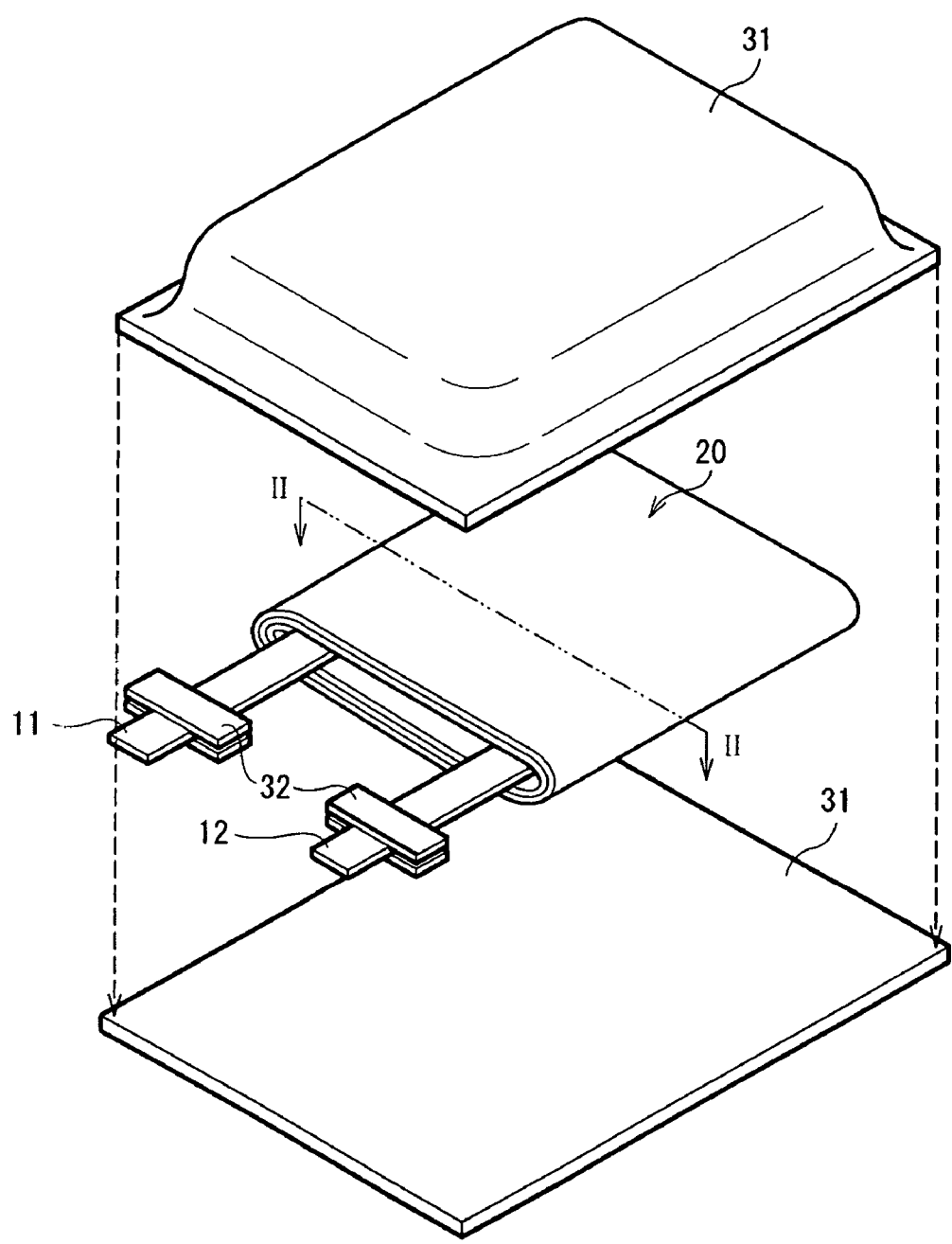
FIG. 1 is an exploded perspective view showing a structure of a secondary battery according to an embodiment of the present invention.

FIG. 1 shows a structure of a secondary battery according to an embodiment of the present invention. In the secondary battery, a spirally wound electrode body 20, on which a cathode lead 11 and an anode lead 12 are attached is accommodated inside a film package member 31. Thereby, a small, light, and thin secondary battery can be obtained.

The cathode lead 11 and the anode lead 12 are respectively directed from inside to outside of the package member 31 in the same direction, for example. The cathode lead 11 and the anode lead 12 are respectively made of, for example, a metal material such as aluminum (Al), copper (Cu), nickel, and stainless, and are in a state of thin plate or mesh, respectively.

The package member 31 is made of a rectangular aluminum laminated film in which, for example, a nylon film, an aluminum foil, and a polyethylene film are bonded together in this order. The package member 31 is, for example, arranged so that the polyethylene film side and the spirally wound electrode body 20 are opposed, and the respective outer edges are contacted to each other by fusion bonding or an adhesive. Adhesive films 32 to protect from outside air intrusion are inserted between the package member 31 and the cathode lead 11, the anode lead 12. The adhesive film 32 is made of a material having contact characteristics to the cathode lead 11 and the anode lead 12 such as a polyolefin resin of polyethylene, polypropylene, modified polyethylene, and modified polypropylene.

The package member 31 may be made of a laminated film having other structure, a high molecular weight film such as polypropylene, or a metal film, instead of the foregoing aluminum laminated film.

Figure 2:
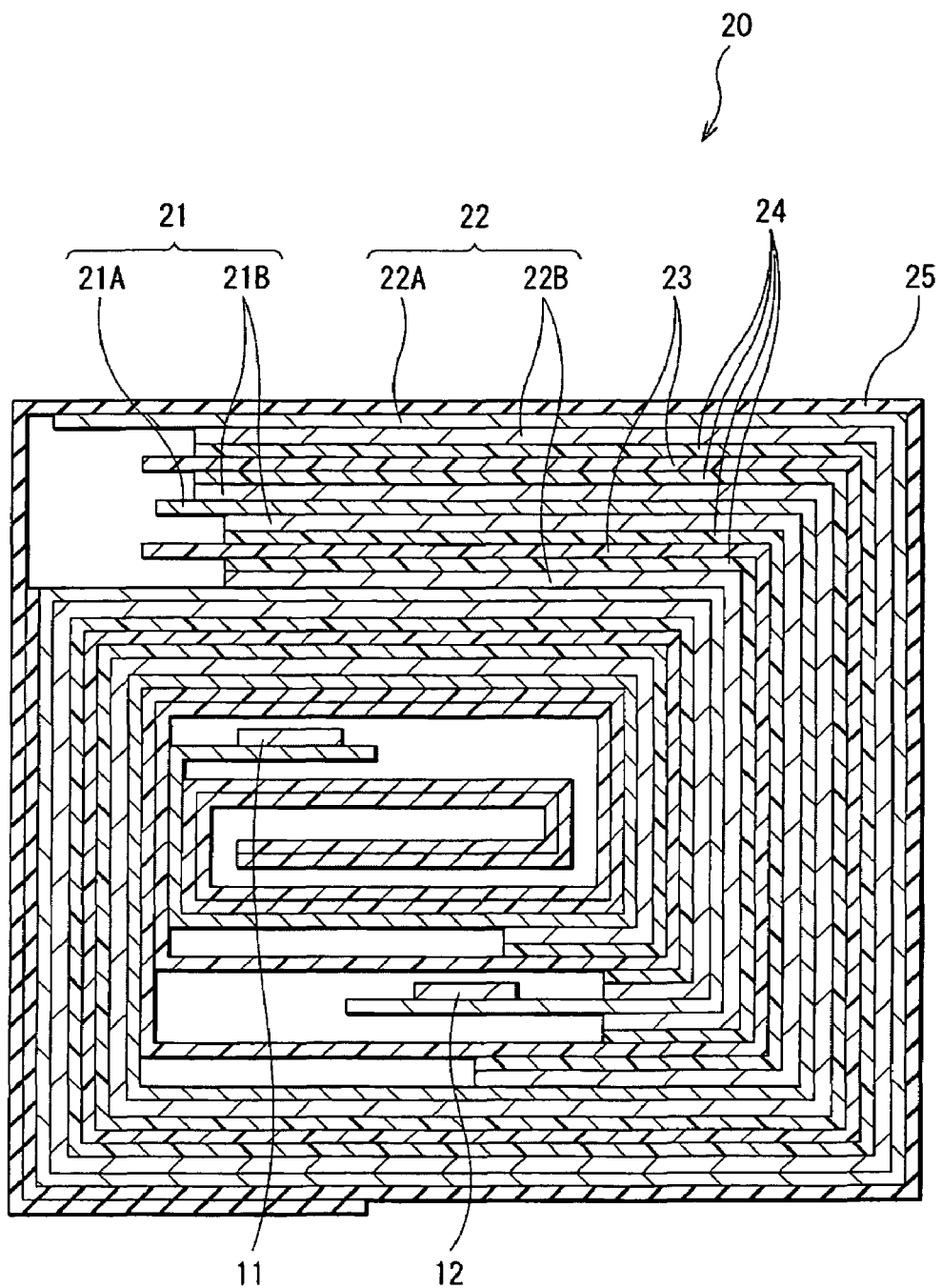
FIG. 2 is a cross section taken along line II-II of a spirally wound electrode body shown in FIG. 1.

FIG. 2 shows a cross section structure taken along line II-II of the spirally wound electrode body 20 shown in FIG. 1. In the spirally wound electrode body 20, a cathode 21 and an anode 22 are layered with a separator 23 and an electrolyte layer 24 in between and wound. The outermost periphery thereof is protected by a protective tape 25.

The cathode 21 has, for example, a cathode current collector 21A having a pair of opposed faces and a cathode active material layer 21B provided on the both faces or the single face of the cathode current collector 21A. In the cathode current collector 21A, there is an exposed portion at one end in the longitudinal direction, which is not provided with the cathode active material layer 21B. The cathode lead 11 is attached to the exposed portion. The cathode current collector 21A is made of a metal material such as aluminum, and is in a state of foil or mesh.

The cathode active material layer 21B contains, for example, as a cathode active material, a cathode material capable of inserting and extracting lithium, which is an electrode reactant. If necessary, the cathode active material layer 21B may contain an electrical conductor such as a carbon material and a binder such as polyvinylidene fluoride.

The cathode material capable of inserting and extracting lithium contains a complex oxide containing lithium, manganese, nickel, and cobalt as a first cathode active material; a complex oxide containing lithium and at least one of nickel and cobalt as a second cathode active material; and at least one of a complex oxide containing lithium and manganese and having a spinel structure and a phosphorous oxide containing lithium and iron as a third cathode active material. Since the cathode material contains the first cathode active material and the second cathode active material, the capacity and the low temperature characteristics can be improved. Since the cathode material contains the third cathode active material, the low temperature characteristics can be further improved.

As the first cathode active material, the compound expressed in Chemical formula 1 is preferably cited, since higher effects can be thereby obtained.

$$Li_kMn_{(1-m-n-p)}Ni_mCo_nM1_pO_{(2-a1)}F_{b1} \quad \text{(Chemical formula 1)}$$

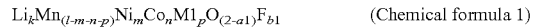

In Chemical formula 1, M1 represents at least one from the group consisting of magnesium (Mg), aluminum, boron (B), titanium (Ti), vanadium (V), chromium (Cr), iron (Fe), copper, zinc (Zn), zirconium (Zr), molybdenum (Mo), tin (Sn), calcium (Ca), strontium (Sr), and tungsten (W). Values of k, m, n, p, a1, and b1 are in the range of $0.9 \leq k \leq 1.1$, $0.3 \leq m \leq 0.8$, $0 < n \leq 0.5$, $0 \leq p \leq 0.1$ $m+n+p<1$, $-0.1 \leq a1 \leq 0.2$, and $0 \leq b1 \leq 0.1$. Further, the value of m is preferably in the range of $0.33 \leq m \leq 0.7$, and in particular preferably in the range of $0.33 \leq m \leq 0.6$. When the value of m is small, the capacity is lowered. Meanwhile, when the value of m is large, gas is generated due to decomposition of the solvent, and the battery is swollen. The composition ratio of lithium varies according to charge and discharge states. The value of k represents a value when the battery is completely discharged.

Specific examples of the first cathode active material include $LiMn_{0.2}Ni_{0.6}Co_{0.2}O_2$, $LiMn_{0.34}Ni_{0.33}Co_{0.33}O_2$, $LiMn_{0.4}Ni_{0.4}Co_{0.2}O_2$, $LiMn_{0.2}Ni_{0.5}Co_{0.3}O_2$, $LiMn_{0.3}Ni_{0.5}Co_{0.2}O_2$ and the like. One first cathode active material may be used singly, or a plurality thereof may be used by mixing.

As a second cathode active material, the compound expressed in Chemical formula 2 is preferably cited, since higher effects can be thereby obtained.

$$Li_qM2_{1-r}M3_rO_{(2-a2)}F_{b2} \quad \text{(Chemical formula 2)}$$

In Chemical formula 2, M2 represents at least one of nickel and cobalt. M3 represents at least one from the group consisting of magnesium, aluminum, boron, titanium, vanadium, chromium, iron, copper, zinc, molybdenum, tin, calcium, strontium, and tungsten. Values of q, r, a2, and b2 are in the range of $0.9 \leq q \leq 1.1$, $0 \leq r \leq 0.1$, $-0.1 \leq a2 \leq 0.2$, and $0 \leq b2 \leq 0.1$. The composition ratio of lithium varies according to charge and discharge states. The value of q represents a value when the battery is completely discharged.

Specific examples of the second cathode active material include $LiCoO_2$, $LiNiO_2$, $LiNi_{0.5}Co_{0.5}O_2$ and the like. One second cathode active material may be used singly, or a plurality thereof may be used by mixing.

As a third cathode active material, the compound expressed in Chemical formula 3 or the compound expressed in Chemical formula 4 is preferable, since the low temperature characteristics can be thereby more improved.

$$Li_sMn_{2-t}M4_tO_uF_{b3} \quad \text{(Chemical formula 3)}$$

$$Li_vFe_{1-w}M5_wPO_4 \quad \text{(Chemical formula 4)}$$

In Chemical formula 3, M4 represents at least one from the group consisting of cobalt, nickel, magnesium, aluminum, boron, titanium, vanadium, chromium, iron, copper, zinc, molybdenum, tin, calcium, strontium, and tungsten. Values of s, t, u, and b3 are in the range of $0.9 \leq s \leq 1.1$, $0 \leq t \leq 0.1$, $3.7 \leq u \leq 4.1$, and $0 \leq b3 \leq 0.1$. The composition ratio of lithium varies according to charge and discharge states. The value of s represents a value when the battery is completely discharged.

In Chemical formula 4, M5 represents at least one from the group consisting of cobalt, manganese, nickel, magnesium, aluminum, boron, titanium, vanadium, niobium (Nb), copper, zinc, molybdenum, calcium, strontium, tungsten, and zirconium. Values of v and w are in the range of $0.9 \leqq v \leqq 1.1$ and $0 \leqq w \leqq 0.1$. The composition ratio of lithium varies according to charge and discharge states. The value of v represents a value when the battery is completely discharged.

Specific examples of the third cathode active material include $LiMn_2O_4$, $LiFePO_4$ and the like. One third cathode active material may be used singly, or a plurality thereof may be used by mixing.

Figure 3:
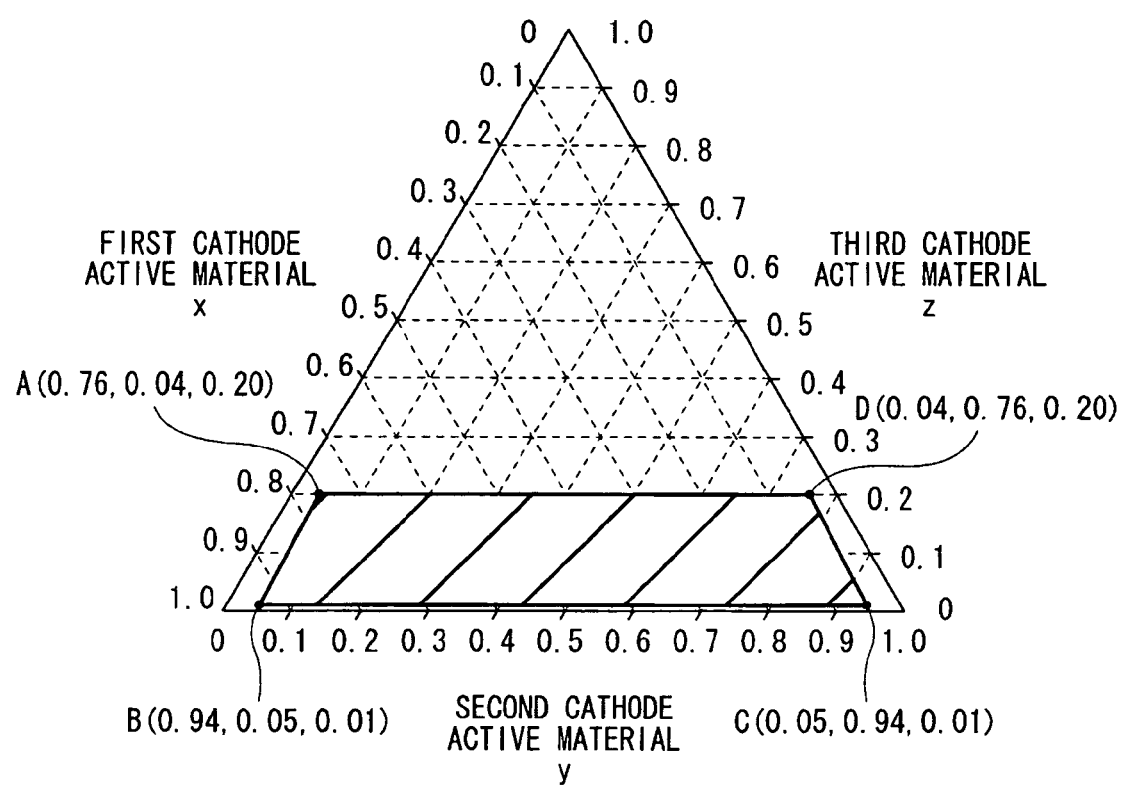
FIG. 3 is a ternary diagram showing a composition of cathode active materials.

As shown in FIG. 3, the ratio of the foregoing cathode active materials is preferably the value in the range obtained by joining each dot of A, B, C, and D expressed in Mathematical formula 1, where the first cathode active material is x, the second cathode active material is y, and the third cathode active material is z in a ternary diagram with the apexes set to each cathode active material. Within such a range, more superior effects can be obtained for the capacity and the low temperature characteristics. In FIG. 3, the range obtained by joining each dot of A, B, C, and D is indicated by a rising diagonal stroke from bottom left to top right.

$A(x,y,z)=(0.76,0.04,0.20)$ $B(x,y,z)=(0.94,0.05,0.01)$ $C(x,y,z)=(0.05,0.94,0.01)$ $D(x,y,z)=(0.04,0.76,0.20)$ (Mathematical formula 1)

As a cathode material capable of inserting and extracting lithium, another cathode material may be mixed with the foregoing cathode active materials. As another cathode material, for example, another complex oxide containing lithium; an oxide such as titanium oxide, vanadium oxide, and manganese dioxide; a disulfide such as iron disulfide, titanium disulfide, and molybdenum disulfide; and a conductive polymer such as polyaniline and polythiophene can be cited.

The anode 22 has, for example, an anode current collector 22A having a pair of opposed faces and an anode active material layer 22B provided on the both faces or the single face of the anode current collector 22A. In the anode current collector 22A, there is an exposed portion at one end in the longitudinal direction, which is not provided with the anode active material layer 22B. The anode lead 12 is attached to the exposed portion. The anode current collector 22A is made of a metal material such as copper, nickel, and stainless, and is in a state of foil or mesh.

The anode active material layer 22B contains, for example, as an anode active material, one or more kinds of anode materials capable of inserting and extracting lithium, which is an electrode reactant. The anode active material layer 22B may contain a binder such as polyvinylidene fluoride and styrene butadiene rubber according to needs.

As an anode material capable of inserting and extracting lithium, for example, a carbon material such as non-graphitizable carbon, artificial graphite, natural graphite, pyrolytic carbons, cokes, graphites, glassy carbons, an organic high molecular weight compound fired body, carbon fiber, activated carbon, and carbon black can be cited. Of the foregoing, cokes include pitch cokes, needle cokes, petroleum cokes and the like. The organic high molecular weight compound fired body is obtained by firing and carbonizing a phenol resin, a furan resin or the like at appropriate temperatures.

As an anode material capable of inserting and extracting lithium, a material, which is capable of inserting and extracting lithium, and contains at least one of metal elements and metalloid elements as an element can be also cited. When such a material is used, a high energy density can be obtained. Such an anode material may be a simple substance, an alloy, or a compound of a metal element or a metalloid element, or may have one or more phases thereof at least in part. In the present invention, alloys include an alloy containing one or more metal elements and one or more metalloid elements in addition to an alloy including two or more metal elements. Further, an alloy may contain nonmetallic elements. The structure thereof includes a solid solution, a eutectic crystal (eutectic mixture), an intermetallic compound, and a structure in which two or more thereof coexist.

As a metal element or a metalloid element composing such an anode material, for example, magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt), which can form an alloy with lithium can be cited. Such material may be crystalline or amorphous.

Specially, as such an anode material, a material containing a metal element or a metalloid element of Group 4B in the short period periodic table as an element is preferable. A material containing at least one of silicon and tin as an element is particularly preferable. Silicon and tin have a high ability to insert and extract lithium, and provide a high energy density.

As an alloy of tin, for example, an alloy containing at least one from the group consisting of silicon, nickel, copper, iron, cobalt, manganese, zinc, indium, silver, titanium, germanium, bismuth, antimony (Sb), and chromium as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

As an anode material capable of inserting and extracting lithium, an oxide inserting and extracting lithium at a relatively lower potential such as iron oxide, ruthenium oxide, molybdenum oxide, tungsten oxide, titanium oxide, and tin oxide, or a nitride can be further cited.

The separator 23 is made of, for example, a synthetic resin porous film made of polytetrafluoroethylene, polypropylene, polyethylene or the like, or a ceramics porous film. The separator 23 may have a structure in which two or more of the foregoing porous films are layered.

The electrolyte layer 24 is made of a so-called gelatinous electrolyte containing an electrolytic solution and a high molecular weight compound. The gelatinous electrolyte is preferable, since a high ion conductivity can be thereby obtained, and liquid leakage of the battery can be thereby prevented.

Any high molecular weight compound may be used as long as the high molecular weight compound absorbs and gelates the electrolytic solution. As such a high molecular weight compound, for example, a fluorinated high molecular weight compound such as polyvinylidene fluoride and a copolymer of vinylidene fluoride and hexafluoropropylene; an ether high molecular weight compound such as polyethylene oxide and a cross-linked body containing polyethylene oxide; polyacrylonitrile; a compound in which polypropylene oxide or polymethacrynitrile is contained as a repeating unit or the like can be cited. In particular, in view of redox stability, the fluorinated high molecular weight compound is desirable. One of the high molecular weight compounds may be used singly, or two or more thereof may be used by mixing.

The electrolytic solution contains, for example, a solvent such as a non-aqueous solvent and an electrolyte salt dissolved in the solvent.

As a solvent, for example, propylene carbonate, ethylene carbonate, diethyl carbonate, dimethyl carbonate, γ-butyrolactone, γ-valerolactone, 1,2-dimethoxy ethane, 1,2-diethoxy ethane, tetrahydrofuran, 2-methyl tetrahydrofuran, 1,3-dioxolane, 4-methyl-1,3-dioxonane, diethyl ether, sulfolane, methyl sulfolane, acetonitrile, propionitrile, ester acetate, ester butyrate, or ester propionate can be cited. One of the solvents may be used singly, or two or more thereof may be used by mixing.

As an electrolyte salt, for example, a lithium salt such as $LiClO_4$, $LiPFG$, $LiBF_4$, $LiN(SO_2CF_3)_2$, $LiAsF_6$, $LiB(C_6H_5)_4$, $CH_3SO_3Li$, $CF_3SO_3Li$, $LiCl$, and $LiBr$ can be cited. One of the electrolyte salts may be used singly, or two or more thereof may be used by mixing.

The secondary battery can be manufactured, for example, as follows.

First, for example, a cathode mixture is prepared by mixing a cathode material, a binder, and if necessary an electrical conductor. The cathode mixture is dispersed in a solvent such as N-methyl-2-pyrrolidone to form cathode mixture slurry. Next, the both faces or the single face of the cathode current collector 21A is coated with the cathode mixture slurry, which is then dried and compression-molded to form the cathode active material layer 21B and to form the cathode 21. Subsequently, for example, the cathode lead 11 is welded to the cathode current collector 21A by, for example, ultrasonic welding or spot welding. After that, a precursor solution containing an electrolytic solution, a high molecular weight compound, and a mixed solvent is prepared. The surface of the cathode active material layer 21B, that is, the both faces or the single face of the cathode 21 is coated with the precursor solution, the mixed solvent is volatilized to form the electrolyte layer 24.

Further, for example, an anode mixture is prepared by mixing an anode material and a binder. The anode mixture is dispersed in a solvent such as N-methyl-2-pyrrolidone to form anode mixture slurry. Next, the both faces or the single face of the anode current collector 22A is coated with the anode mixture slurry, which is then dried, and compression-molded to form the anode active material layer 22B and form the anode 22. Subsequently, the anode lead 12 is welded to the anode current collector 22A by, for example, ultrasonic welding or spot welding. The electrolyte layer 24 is formed on the anode active material layer 22B, that is, on the both faces or the single face of the anode 22 as in the cathode 21.

After that, the cathode 21 and the anode 22 formed with the electrolyte layer 24 are layered with the separator 23 in between and wound. The protective tape 25 is adhered to the outermost periphery thereof to form the spirally wound electrode body 20. Lastly, for example, the spirally wound electrode body 20 is sandwiched between the package members 31, and outer edges of the package members 31 are contacted by thermal fusion bonding or the like to enclose the spirally wound electrode body 20. Then, the adhesive films 32 are inserted between the cathode lead 11, the anode lead 12 and the package member 31. Thereby, the secondary battery shown in FIG. 1 and FIG. 2 is completed.

Further, the foregoing secondary battery may be fabricated as follows. First, as described above, the cathode 21 and the anode 22 are formed, and the cathode lead 11 and the anode lead 12 are attached on the cathode 21 and the anode 22. After that, the cathode 21 and the anode 22 are layered with the separator 23 in between and wound. The protective tape 25 is adhered to the outermost periphery thereof, and a spirally wound body, which is the precursor of the spirally wound electrode body 20, is formed. Next, the spirally wound body is sandwiched between the package members 31, the outermost peripheries except for one side are thermally fusion-bonded to obtain a pouched state, and the spirally wound body is contained inside the package member 31. Subsequently, a composition of matter for electrolyte containing an electrolytic solution, a monomer, which is a raw material of the high molecular weight compound, a polymerization initiator, and if necessary other material such as a polymerization inhibitor is prepared, which is injected inside the package member 31.

After the composition of matter for electrolyte is injected, the opening of the package member 31 is thermally fusion-bonded and hermetically sealed in the vacuum atmosphere. Next, the resultant is heated to polymerize the monomer to obtain a high molecular weight compound. Thereby, the gelatinous electrolyte layer 24 is formed, and the secondary battery shown in FIG. 1 is assembled.

In the secondary battery, when charged, lithium ions are extracted from the cathode 21 and inserted in the anode 22 through the electrolyte layer 24. When discharged, for example, lithium ions are extracted from the anode 22 and inserted in the cathode 21 through the electrolyte layer 24. Here, since the cathode 21 contains the first cathode active material, the second cathode active material, and the third cathode active material at the foregoing ratio, the capacity and the low temperature characteristics are improved.

As above, according to the battery of this embodiment, since the cathode 21 contains the first cathode active material, the second cathode active material, and the third cathode active material at a given ratio, the capacity and the low temperature characteristics can be improved.

Further, when the value of m in the compound expressed in Chemical formula 1 is in the range of $0.33 \leq m \leq 0.7$, lowering of the capacity can be inhibited, and generation of gas due to decomposition of the solvent can be inhibited.

EXAMPLES

Further, specific examples of the present invention will be hereinafter described in detail with reference to the drawings.

Examples 1-1 to 1-5

First, a cathode material, polyvinylidene fluoride as a binder, and artificial graphite as an electrical conductor were mixed at a weight ratio of cathode material:binder:electrical conductor=91.0:3.0:6.0 to prepare a cathode mixture. The cathode mixture was dispersed in N-methyl-2-pyrrolidone as a solvent to obtain cathode mixture slurry. After that, the cathode current collector 21A made of a strip-shaped aluminum foil was uniformly coated with the cathode mixture slurry, which was dried and compression-molded by a roll pressing machine to form the cathode active material layer 21B and form the cathode 21. Then, for the cathode material, a cathode material, in which $LiMn_{0.2}Ni_{0.6}Co_{0.2}O_2$ as the first cathode active material, $LiCoO_2$ as the second cathode active material, and $LiMn_2O_4$ as the third cathode active material were mixed at a ratio shown in Table 1 was used. After that, the cathode lead 11 was attached to the cathode 21 by spot welding.

TABLE 1

|  | $LiMn_{0.2}Ni_{0.6}Co_{0.2}O_2$ (wt %) | $LiCoO_2$ (wt %) | $LiMn_2O_4$ (wt %) | Capacity (mAh) | Low temperature characteristics (%) |
|---|---|---|---|---|---|
| Example 1-1 | 0.05 | 0.94 | 0.01 | 542 | 53 |
| Example 1-2 | 0.94 | 0.05 | 0.01 | 575 | 55 |
| Example 1-3 | 0.04 | 0.76 | 0.2 | 535 | 60 |
| Example 1-4 | 0.76 | 0.04 | 0.2 | 570 | 65 |
| Example 1-5 | 0.4 | 0.4 | 0.2 | 566 | 62 |
| Comparative example 1-1 | 0 | 0.99 | 0.01 | 534 | 48 |
| Comparative example 1-2 | 0.99 | 0 | 0.01 | 580 | 47 |
| Comparative example 1-3 | 0.33 | 0.33 | 0.33 | 483 | 69 |
| Comparative example 1-4 | 0 | 1 | 0 | 542 | 45 |
| Comparative example 1-5 | 1 | 0 | 0 | 590 | 46 |
| Comparative example 1-6 | 0 | 0 | 1 | 230 | 78 |

Further, artificial graphite as an anode material and polyvinylidene fluoride as a binder were mixed at a weight ratio of anode material:binder=90:10 to prepare an anode mixture. The anode mixture was dispersed in N-methyl-2-pyrrolidone as a solvent to obtain anode mixture slurry. After that, the anode current collector 22A made of a strip-shaped copper foil was uniformly coated with the anode mixture slurry, which was dried and compression-molded by a roll pressing machine to form the anode active material layer 22B and form the anode 22. After that, the anode lead 12 was attached to the anode 22 by spot welding.

Subsequently, an electrolytic solution was formed by dissolving $LiPF_6$ as an electrolyte salt in a solvent in which ethylene carbonate and propylene carbonate as a solvent were mixed at a weight ratio of ethylene carbonate:propylene carbonate=6:4. Then, the concentration of $LiPF_6$ was 1.0 mol/kg. The electrolytic solution, a copolymer of hexafluoropropylene and vinylidene fluoride as a high molecular weight compound, and dimethyl carbonate as a mixed solvent were mixed and dissolved to form a sol precursor solution. The ratio of hexafluoropropylene in the copolymer was 7 wt %.

The cathode 21 and the anode 22 were respectively coated with the obtained precursor solution by using a bar coater, the mixed solvent was volatilized to form the gelatinous electrolyte layer 24.

After that, the cathode 21 and the anode 22, on which the electrolyte layer 24 was respectively formed, were layered with the separator 23 made of a polyethylene film in between, and the lamination was wound to obtain the spirally wound electrode body 20.

The obtained spirally wound electrode body 20 was sandwiched between the package members 31 made of a laminated film, and enclosed therein under depressurization. Thereby, the secondary battery shown in FIG. 1 and FIG. 2 was obtained.

As Comparative examples 1-1 to 1-6 relative to Examples 1-1 to 1-5, secondary batteries were fabricated as in Examples 1-1 to 1-5, except that one, two, or three kinds of the cathode material were mixed at a ratio shown in Table 1.

For the fabricated secondary batteries of Examples 1-1 to 1-5 and Comparative examples 1-1 to 1-6, the capacity and the low temperature characteristics were examined. Then, the capacity was obtained as follows. Constant current and constant voltage charge was performed under the conditions of 23 deg C., the upper limit voltage of 4.2 V, and the current value of 1 C. After that, constant current discharge was performed under the conditions of 23 deg C., the current value of 1 C, and the final voltage of 3 V, and the discharge capacity was then obtained. Further, the low temperature characteristics were obtained as follows. First, constant current and constant voltage charge was performed under the conditions of −20 deg C., the upper limit voltage of 4.2 V, and the current value of 1 C. After that, constant current discharge was performed under the conditions of −20 deg C., the current value of 1 C, and the final voltage of 3 V, and the discharge capacity was then obtained. The low temperature characteristics were obtained by retention ratio of (discharge capacity at −20 deg C.) to (discharge capacity at 23 deg C.), that is, (discharge capacity at −20 deg C./discharge capacity at 23 deg C.)×100 (%). The results are shown in Table 1 and FIG. 4. 1 C means the current value, at which the theoretical capacity of the battery is all discharged in one hour.

Figure 4:
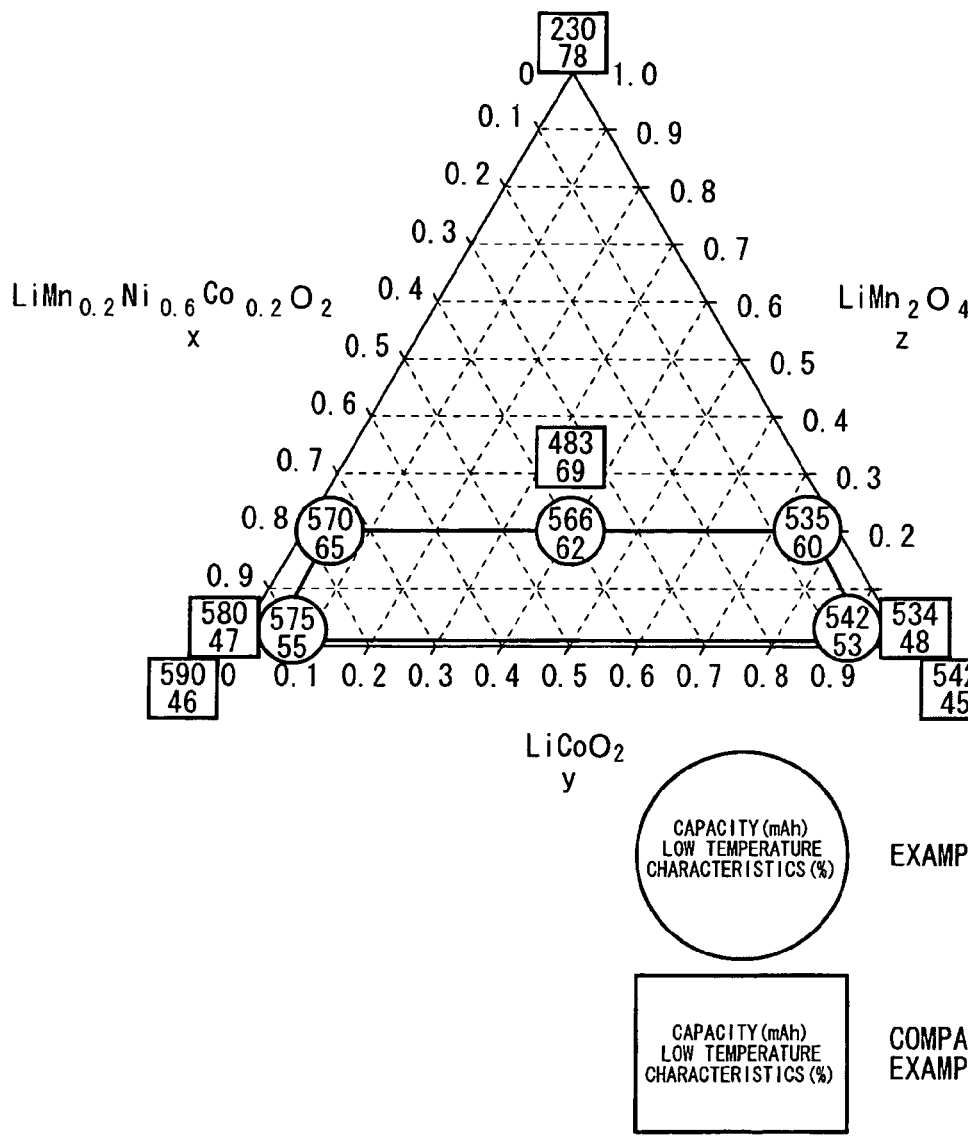
FIG. 4 is a characteristics view showing battery characteristics according to Examples 1-1 to 1-5 of the present invention.

As evidenced by Table 1 and FIG. 4, according to Examples 1-1 to 1-5, in which $LiMn_{0.2}Ni_{0.6}Co_{0.2}O_2$ as the first cathode active material, $LiCoO_2$ as the second cathode active material, and $LiMn_2O_4$ as the third cathode active material were used, and the ratio of each cathode active material was a value in the range obtained by joining each dot of A, B, C, and D expressed in Mathematical formula 1 in the ternary diagram shown in FIG. 3, higher values were obtained for both the capacity and the low temperature characteristics, compared to in Comparative examples 1-1 to 1-6, in which the ratio of each cathode active material was out of such a range.

That is, it was found that when the cathode material in which the complex oxide containing lithium, manganese, nickel, and cobalt was used as the first cathode active material, the complex oxide containing lithium and cobalt was used as the second cathode active material, the complex oxide containing lithium and manganese and having a spinel structure was used as the third cathode active material, and the ratio of each cathode active material was a value in the range obtained by joining each dot of A, B, C, and D expressed in Mathematical formula 1 in the ternary diagram shown in FIG. 3 was used, the capacity and the low temperature characteristics could be improved.

Examples 2-1 to 2-5, and 3-1 to 3-5

Secondary batteries were fabricated as in Examples 1-1 to 1-5, except that as the second cathode active material, $LiNi_{0.5}Co_{0.5}O_2$ or $LiNiO_2$ was used. Then, each cathode active material was mixed at a ratio shown in Tables 2 and 3.

TABLE 2

|  | $LiMn_{0.2}Ni_{0.6}Co_{0.2}O_2$ (wt %) | $LiNi_{0.5}Co_{0.5}O_2$ (wt %) | $LiMn_2O_4$ (wt %) | Capacity (mAh) | Low temperature characteristics (%) |
|---|---|---|---|---|---|
| Example 2-1 | 0.05 | 0.94 | 0.01 | 639 | 58 |
| Example 2-2 | 0.94 | 0.05 | 0.01 | 680 | 57 |
| Example 2-3 | 0.04 | 0.76 | 0.2 | 624 | 65 |
| Example 2-4 | 0.76 | 0.04 | 0.2 | 631 | 67 |
| Example 2-5 | 0.4 | 0.4 | 0.2 | 626 | 60 |
| Comparative example 2-1 | 0 | 0.99 | 0.01 | 620 | 46 |
| Comparative example 2-2 | 0.99 | 0 | 0.01 | 675 | 42 |
| Comparative example 2-3 | 0.33 | 0.33 | 0.33 | 549 | 65 |
| Comparative example 2-4 | 0 | 1 | 0 | 632 | 43 |
| Comparative example 2-5 | 1 | 0 | 0 | 690 | 41 |
| Comparative example 2-6 | 0 | 0 | 1 | 279 | 73 |

TABLE 3

|  | $LiMn_{0.2}Ni_{0.6}Co_{0.2}O_2$ (wt %) | $LiNiO_2$ (wt %) | $LiMn_2O_4$ (wt %) | Capacity (mAh) | Low temperature characteristics (%) |
|---|---|---|---|---|---|
| Example 3-1 | 0.05 | 0.94 | 0.01 | 710 | 58 |
| Example 3-2 | 0.94 | 0.05 | 0.01 | 755 | 59 |
| Example 3-3 | 0.04 | 0.76 | 0.2 | 693 | 67 |
| Example 3-4 | 0.76 | 0.04 | 0.2 | 701 | 69 |
| Example 3-5 | 0.4 | 0.4 | 0.2 | 695 | 61 |
| Comparative example 3-1 | 0 | 0.99 | 0.01 | 689 | 45 |
| Comparative example 3-2 | 0.99 | 0 | 0.01 | 750 | 43 |
| Comparative example 3-3 | 0.33 | 0.33 | 0.33 | 610 | 64 |
| Comparative example 3-4 | 0 | 1 | 0 | 702 | 42 |
| Comparative example 3-5 | 1 | 0 | 0 | 767 | 39 |
| Comparative example 3-6 | 0 | 0 | 1 | 310 | 70 |

As Comparative examples 2-1 to 2-6 and 3-1 to 3-6 relative to Examples 2-1 to 2-5 and 3-1 to 3-5, secondary batteries were fabricated as in Examples 2-1 to 2-5 and 3-1 to 3-5, except that one, two or three kinds of the cathode material were mixed at a ratio shown in Tables 2 and 3.

For the fabricated secondary batteries of Examples 2-1 to 2-5 and 3-1 to 3-5, and Comparative examples 2-1 to 2-6 and 3-1 to 3-6, the capacity and the low temperature characteristics were examined as in Examples 1-1 to 1-5. The results are shown in Tables 2 and 3 and FIGS. 5 and 6.

Figure 5:
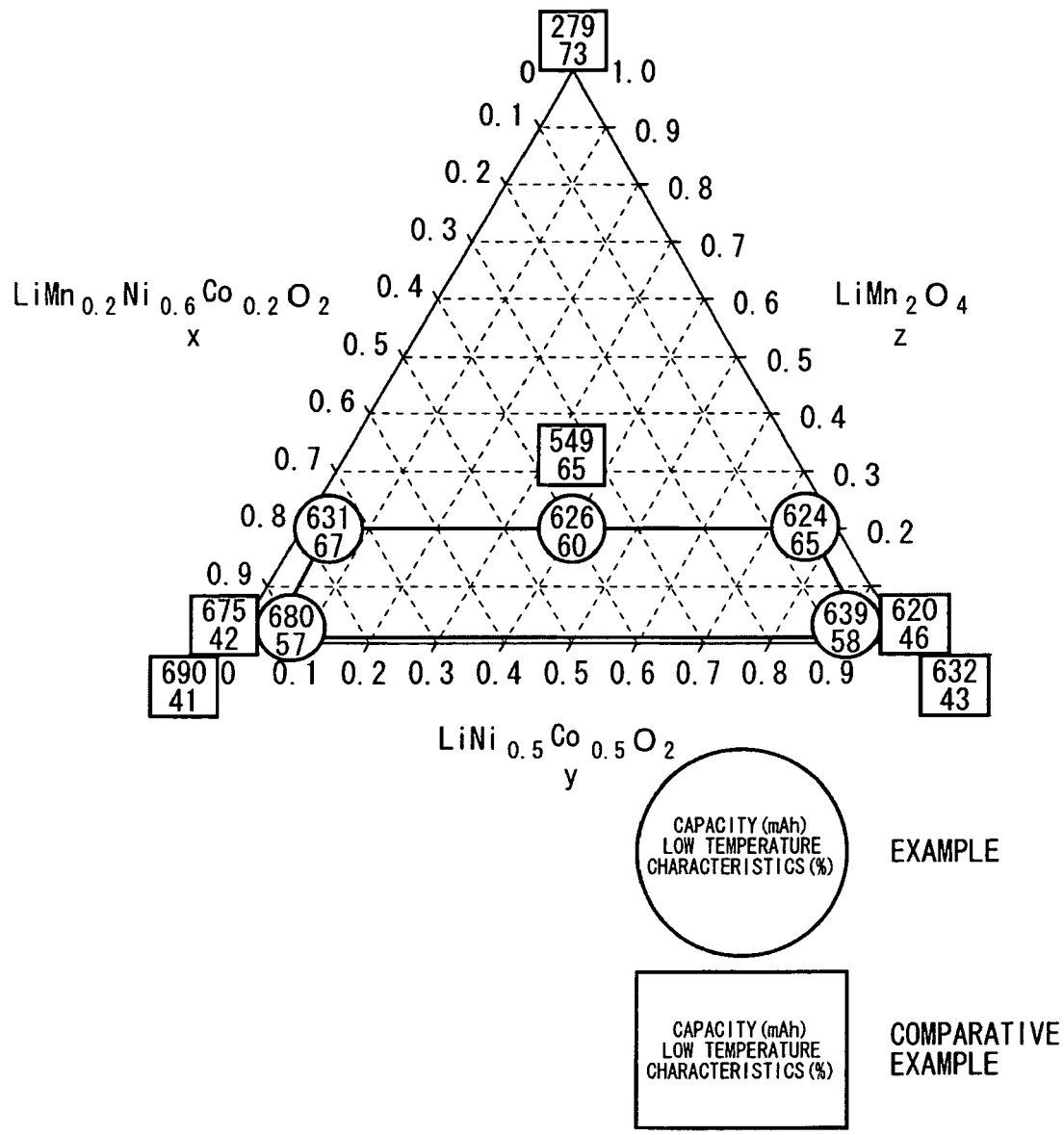
FIG. 5 is a characteristics view showing battery characteristics according to Examples 2-1 to 2-5 of the present invention.
Figure 6:
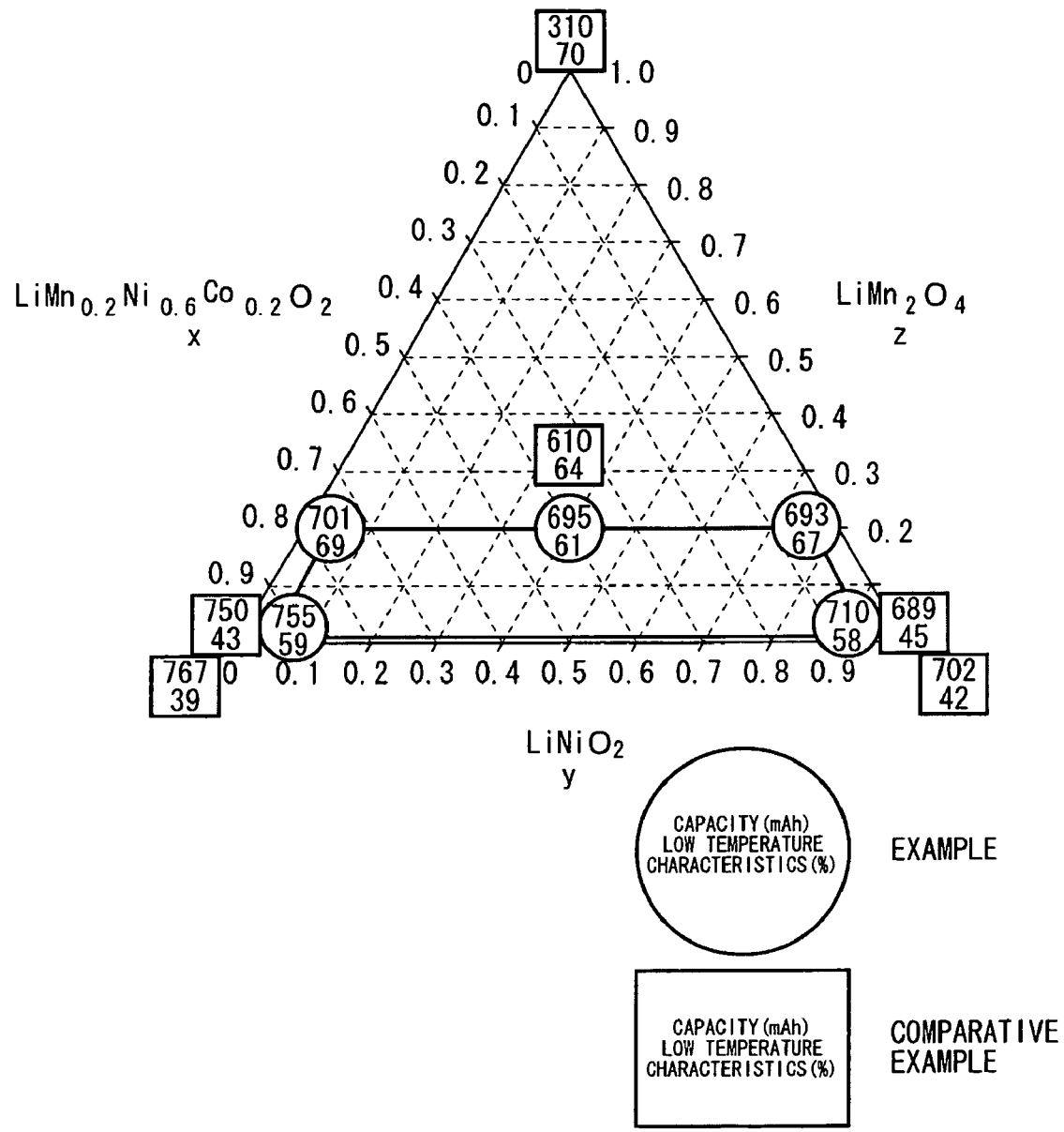
FIG. 6 is a characteristics view showing battery characteristics according to Examples 3-1 to 3-5 of the present invention.

As evidenced by Tables 2 and 3 and FIGS. 5 and 6, according to Examples 2-1 to 2-5 and 3-1 to 3-5, in which as the second cathode active material, the complex oxide containing lithium, nickel, and cobalt; or the complex oxide containing lithium and nickel was used, high values were obtained for both the capacity and the low temperature characteristics as in Examples 1-1 to 1-5.

That is, it was found that when as the second cathode active material, the complex oxide containing lithium and at least one of nickel and cobalt was used, the capacity and the low temperature characteristics could be improved.

Examples 4-1 to 4-5, 5-1 to 5-5, and 6-1 to 6-5

Secondary batteries were fabricated as in Examples 1-1 to 1-5, 2-1 to 2-5, and 3-1 to 3-5, except that as the third cathode active material, $LiFePO_4$ was used. Then, each cathode active material was mixed at a ratio shown in Tables 4 to 6.

TABLE 4

|  | $LiMn_{0.2}Ni_{0.6}Co_{0.2}O_2$ (wt %) | $LiCoO_2$ (wt %) | $LiFePO_4$ (wt %) | Capacity (mAh) | Low temperature characteristics (%) |
| --- | --- | --- | --- | --- | --- |
| Example 4-1 | 0.05 | 0.94 | 0.01 | 539 | 52 |
| Example 4-2 | 0.94 | 0.05 | 0.01 | 572 | 54 |
| Example 4-3 | 0.04 | 0.76 | 0.2 | 525 | 56 |
| Example 4-4 | 0.76 | 0.04 | 0.2 | 565 | 59 |
| Example 4-5 | 0.4 | 0.4 | 0.2 | 556 | 58 |
| Comparative example 4-1 | 0 | 0.99 | 0.01 | 531 | 47 |
| Comparative example 4-2 | 0.99 | 0 | 0.01 | 577 | 46 |
| Comparative example 4-3 | 0.33 | 0.33 | 0.33 | 481 | 61 |
| Comparative example 4-4 | 0 | 1 | 0 | 542 | 45 |
| Comparative example 4-5 | 1 | 0 | 0 | 590 | 43 |
| Comparative example 4-6 | 0 | 0 | 1 | 260 | 64 |

TABLE 5

|  | $LiMn_{0.2}Ni_{0.6}Co_{0.2}O_2$ (wt %) | $LiNi_{0.5}Co_{0.5}O_2$ (wt %) | $LiFePO_4$ (wt %) | Capacity (mAh) | Low temperature characteristics (%) |
| --- | --- | --- | --- | --- | --- |
| Example 5-1 | 0.05 | 0.94 | 0.01 | 639 | 56 |
| Example 5-2 | 0.94 | 0.05 | 0.01 | 683 | 58 |
| Example 5-3 | 0.04 | 0.76 | 0.2 | 626 | 57 |
| Example 5-4 | 0.76 | 0.04 | 0.2 | 648 | 61 |
| Example 5-5 | 0.4 | 0.4 | 0.2 | 640 | 64 |
| Comparative example 5-1 | 0 | 0.99 | 0.01 | 635 | 43 |
| Comparative example 5-2 | 0.99 | 0 | 0.01 | 684 | 47 |
| Comparative example 5-3 | 0.33 | 0.33 | 0.33 | 572 | 67 |
| Comparative example 5-4 | 0 | 1 | 0 | 639 | 41 |
| Comparative example 5-5 | 1 | 0 | 0 | 703 | 45 |
| Comparative example 5-6 | 0 | 0 | 1 | 306 | 68 |

TABLE 6

|  | $LiMn_{0.2}Ni_{0.6}Co_{0.2}O_2$ (wt %) | $LiNiO_2$ (wt %) | $LiFePO_4$ (wt %) | Capacity (mAh) | Low temperature characteristics (%) |
| --- | --- | --- | --- | --- | --- |
| Example 6-1 | 0.05 | 0.94 | 0.01 | 710 | 58 |
| Example 6-2 | 0.94 | 0.05 | 0.01 | 759 | 60 |
| Example 6-3 | 0.04 | 0.76 | 0.2 | 695 | 54 |
| Example 6-4 | 0.76 | 0.04 | 0.2 | 720 | 60 |
| Example 6-5 | 0.4 | 0.4 | 0.2 | 711 | 63 |
| Comparative example 6-1 | 0 | 0.99 | 0.01 | 705 | 44 |
| Comparative example 6-2 | 0.99 | 0 | 0.01 | 760 | 47 |
| Comparative example 6-3 | 0.33 | 0.33 | 0.33 | 635 | 65 |
| Comparative example 6-4 | 0 | 1 | 0 | 710 | 43 |
| Comparative example 6-5 | 1 | 0 | 0 | 781 | 46 |
| Comparative example 6-6 | 0 | 0 | 1 | 340 | 69 |

As Comparative examples 4-1 to 4-6, 5-1 to 5-6, and 6-1 to 6-6 relative to Examples 4-1 to 4-5, 5-1 to 5-5, and 6-1 to 6-5, secondary batteries were fabricated as in Examples 4-1 to 4-5, 5-1 to 5-5, and 6-1 to 6-5, except that one, two or three kinds of the cathode material were mixed at a ratio shown in Tables 4 to 6.

For the secondary batteries of Examples 4-1 to 4-5, 5-1 to 5-5, and 6-1 to 6-5 and Comparative examples 4-1 to 4-6, 5-1 to 5-6, and 6-1 to 6-6, the capacity and the low temperature characteristics were examined as in Examples 1-1 to 1-5. The results are shown in Tables 4 to 6 and FIGS. 7 to 9.

Figure 7:
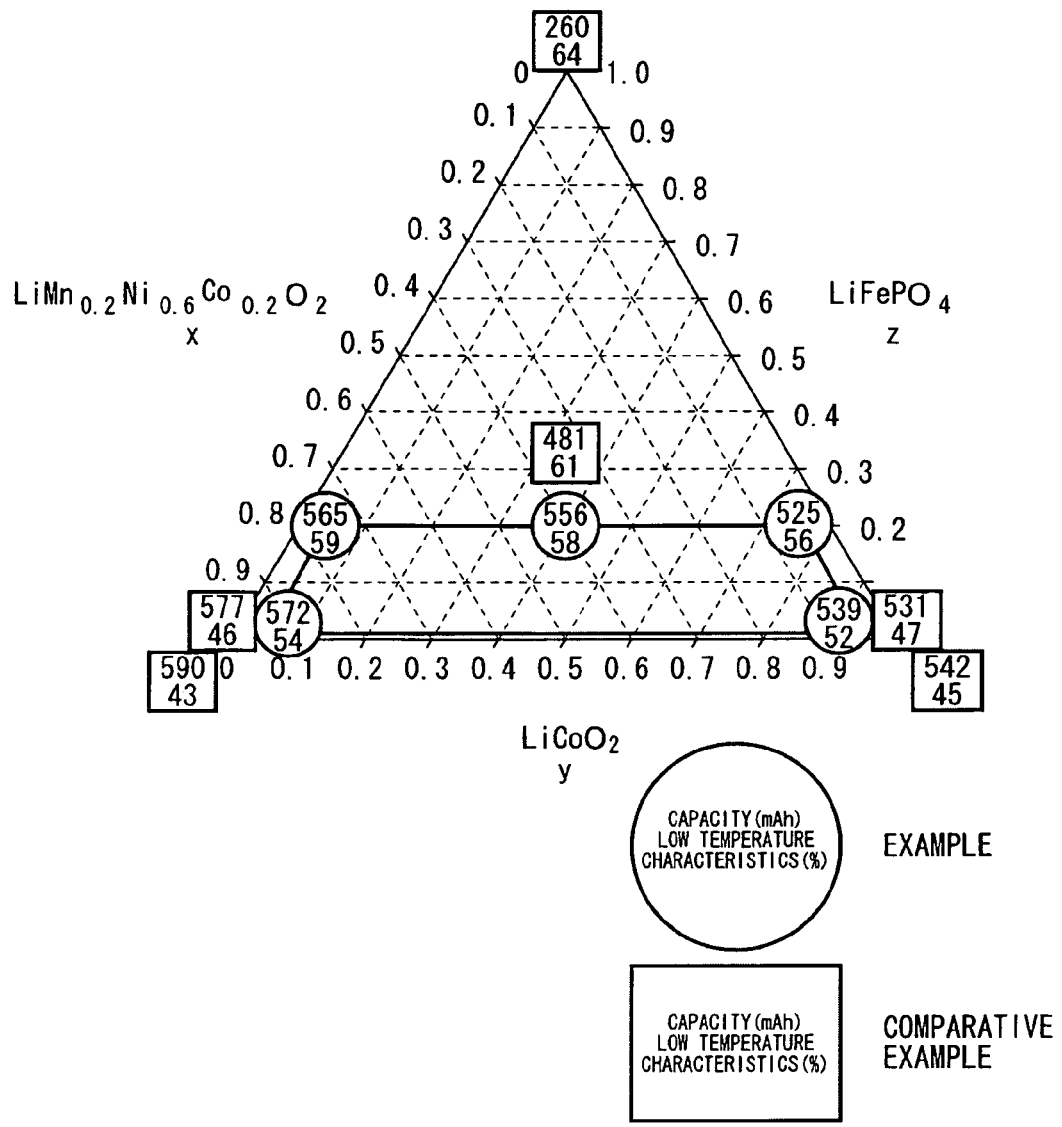
FIG. 7 is a characteristics view showing battery characteristics according to Examples 4-1 to 4-5 of the present invention.
Figure 8:
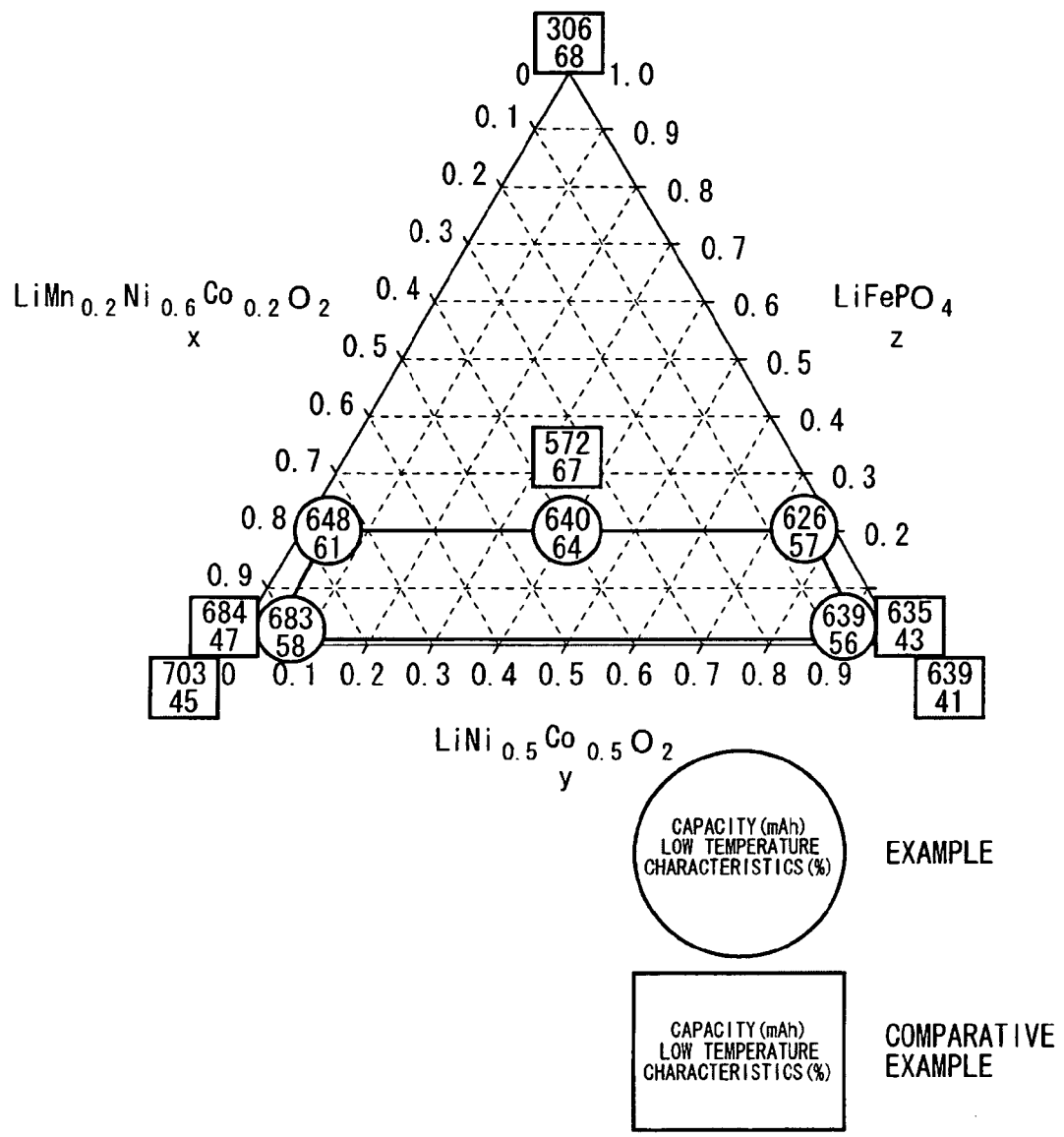
FIG. 8 is a characteristics view showing battery characteristics according to Examples 5-1 to 5-5 of the present invention.
Figure 9:
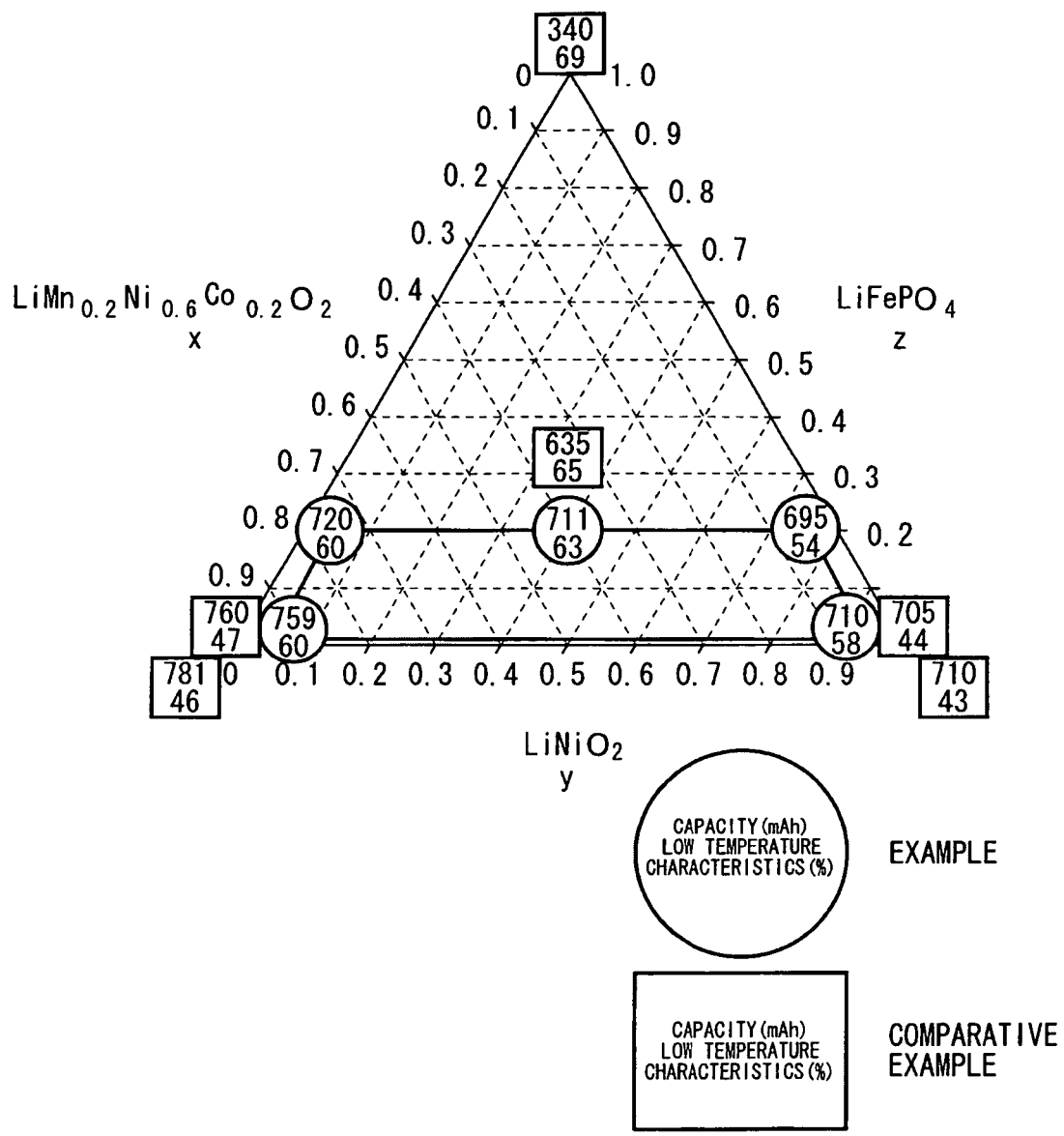
FIG. 9 is a characteristics view showing battery characteristics according to Examples 6-1 to 6-5 of the present invention.

As evidenced by Tables 4 to 6 and FIGS. 7 to 9, according to Examples 4-1 to 4-5, 5-1 to 5-5, and 6-1 to 6-5, in which as the third cathode active material, the phosphorus oxide containing lithium and iron was used, high values were obtained for both the capacity and the low temperature characteristics as in Examples 1-1 to 1-5, 2-1 to 2-5, and 3-1 to 3-5.

That is, it was found that when as the third cathode active material, at least one of the complex oxide containing lithium and manganese and having a spinel structure and the phosphorus oxide containing lithium and iron was used, the capacity and the low temperature characteristics could be improved.

Examples 7-1 to 7-6 and 8-1 to 8-6

Secondary batteries were fabricated as in Examples 1-5 and 4-5, except that as the first cathode active material, a compound expressed by $LiMn_{(1-m-n)}Ni_mCo_nO_2$ was used, and values of m and n were changed as shown in Tables 7 and 8, that is, the value of m was changed in the range of $0.33 \leq m \leq 0.7$. The second cathode active material was $LiCoO_2$, and the third cathode active material was $LiMn_2O_4$ or $LiFePO_4$. The ratio by the weight ratio of $LiMn_{(1-m-n)}Ni_mCo_nO_2$, $LiCoO_2$, and $LiMn_2O_4$ or $LiFePO_4$ was $LiMn_{(1-m-n)}Ni_mCo_nO_2:LiCoO_2:LiMn_2O_4$ or $LiFePO_4=0.4:0.4:0.2$. Further, the composition of the first cathode active material of Example 7-5 was the same as in Example 1-5, and the composition of the first cathode active material of Example 8-5 was the same as in Example 4-5.

TABLE 7

|  | 1 − m − n | m | n | Capacity (mAh) | Swollenness ratio (%) |
|---|---|---|---|---|---|
| Example 7-1 | 0.34 | 0.33 | 0.33 | 540 | 0.7 |
| Example 7-2 | 0.4 | 0.4 | 0.2 | 545 | 1.1 |
| Example 7-3 | 0.2 | 0.5 | 0.3 | 559 | 1.8 |
| Example 7-4 | 0.3 | 0.5 | 0.2 | 550 | 1.5 |
| Example 7-5 | 0.2 | 0.6 | 0.2 | 566 | 2.0 |
| Example 7-6 | 0.2 | 0.7 | 0.1 | 573 | 5.0 |
| Comparative example 7-1 | 0 | 1 | 0 | 590 | 12.0 |
| Comparative example 7-2 | 1 | 0 | 0 | 260 | 0.6 |
| Comparative example 7-3 | 0 | 0 | 1 | 521 | 0.2 |

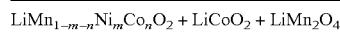
$LiMn_{1-m-n}Ni_mCo_nO_2 + LiCoO_2 + LiMn_2O_4$

TABLE 8

|  | 1 − m − n | m | n | Capacity (mAh) | Swollenness ratio (%) |
|---|---|---|---|---|---|
| Example 8-1 | 0.34 | 0.33 | 0.33 | 538 | 0.6 |
| Example 8-2 | 0.4 | 0.4 | 0.2 | 542 | 1.0 |

TABLE 8-continued

|  | 1 − m − n | m | n | Capacity (mAh) | Swollenness ratio (%) |
|---|---|---|---|---|---|
| Example 8-3 | 0.2 | 0.5 | 0.3 | 554 | 1.9 |
| Example 8-4 | 0.3 | 0.5 | 0.2 | 547 | 1.6 |
| Example 8-5 | 0.2 | 0.6 | 0.2 | 556 | 2.1 |
| Example 8-6 | 0.2 | 0.7 | 0.1 | 569 | 5.2 |
| Comparative example 8-1 | 0 | 1 | 0 | 586 | 12.3 |
| Comparative example 8-2 | 1 | 0 | 0 | 272 | 0.5 |
| Comparative example 8-3 | 0 | 0 | 1 | 525 | 0.2 |

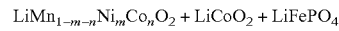
$LiMn_{1-m-n}Ni_mCo_nO_2 + LiCoO_2 + LiFePO_4$

As Comparative examples 7-1 to 7-3 and 8-1 to 8-3 relative to Examples 7-1 to 7-6 and 8-1 to 8-6, secondary batteries were fabricated as in Examples 7-1 to 7-6 and 8-1 to 8-6, except that the values of m and n in the first cathode active material were changed as shown in Tables 7 and 8, that is, the value of m was changed in the range from under 0.3 to over 0.7.

For the fabricated secondary batteries of Examples 7-1 to 7-6 and 8-1 to 8-6 and Comparative examples 7-1 to 7-3 and 8-1 to 8-3, the capacity and the high temperature storage characteristics were examined. Then, the capacity was obtained as follows. Constant current and constant voltage charge was performed under the conditions of 23 deg C., the upper limit voltage of 4.2 V, and the current value of 1 C. After that, constant current discharge was performed under the conditions of 23 deg C., the current value of 1 C and the final voltage of 3 V, and the discharge capacity was then obtained. Further, the high temperature storage characteristics were obtained as follows. Constant current and constant voltage charge was performed under the conditions of 23 deg C., the upper limit voltage of 4.2 V, and the current value of 1 C. After that, the batteries were stored for 28 days at 60 deg C. Then, the high temperature storage characteristics were obtained by a swollenness ratio after stored at high temperature, that is, [(thickness of battery after stored at high temperature-thickness of battery before stored at high temperature)/(thickness of battery before stored at high temperature)]×100%. The results are shown in Tables 7 and 8.

As evidenced by Tables 7 and 8, according to Examples 7-1 to 7-6 and 8-1 to 8-6, in which the value of m was in the range of $0.33 \leq m \leq 0.7$, the swollenness ratio after stored at high temperature was smaller than in Comparative examples 7-1 and 8-1, in which m was over 0.7; and the capacity was higher than in Comparative examples 7-2, 7-3, 8-2, and 8-3, in which m was under 0.3. Further, in Examples 7-1 to 7-5 and 8-1 to 8-5, in which the value of m was 0.6 or less, the capacity was particularly high, and the swollenness ratio was particularly small.

That is, it was found that when the value of m in the compound expressed in Chemical formula 1 was in the range of $0.33 \leq m \leq 0.7$, the swollenness of the battery could be more inhibited, and the capacity could be further improved. Further, it was found that m was in particular preferably 0.6 or less.

The present invention has been described with reference to the embodiment and the examples. However, the present invention is not limited to the foregoing embodiment and examples, and various modifications may be made. For example, in the foregoing embodiment and examples, descriptions have been given of the case using the gelatinous electrolyte. However, other electrolyte may be used. As other electrolyte, an electrolytic solution only, a solid electrolyte having ion conductivity, a mixture of a solid electrolyte and an electrolytic solution, or a mixture of a solid electrolyte and a gelatinous electrolyte can be cited.

For the solid electrolyte, for example, a high molecular weight solid electrolyte in which an electrolyte salt is dispersed in a high molecular weight compound having ion conductivity, or an inorganic solid electrolyte made of ion conductive glass, ionic crystal or the like can be used. As a high molecular weight compound of the high molecular weight solid electrolyte, for example, an ether high molecular weight compound such as polyethylene oxide and a cross-linked body containing polyethylene oxide, an ester high molecular weight compound such as poly methacrylate, or an acrylate high molecular weight compound can be used singly, by mixing, or by copolymerization. As an inorganic solid electrolyte, an electrolyte containing lithium nitride, lithium phosphate or the like can be used.

Further, in the foregoing embodiment and examples, descriptions have been given of the case including the spirally wound electrode body 20 in which the cathode 21 and the anode 22 are wound. However, the present invention can be similarly applied to the case including a card-type battery device, in which a layer of a cathode and a layer of an anode are laminated with a separator and an electrolyte in between; the case including a lamination-type battery device, in which two or more layers of cathodes and two or more layers of anodes are alternately laminated with a separator and an electrolyte in between; or the case including a battery device, in which a cathode and an anode are laminated with a separator and an electrolyte layer in between and folded.

Furthermore, in the foregoing embodiment and examples, descriptions have been given of the case, in which a film is used for the package member 31. However, the present invention can be applied to a secondary battery such as a cylinder-type battery, a square-type battery, a coin-type battery, and a button-type battery using a metallic container for the package member. In this case, similar effect can be obtained, and by setting the value of m in the compound expressed in Chemical formula 1 to the range of $0.33 \leq m \leq 0.7$ to inhibit generation of gas due to decomposition of the solvent, the metallic container can be prevented from being deformed and the long life of the battery can be attained. In addition, the present invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. A cathode material containing a first cathode active material, a second cathode active material, and a third cathode active material,
wherein,
the first cathode active material is a complex oxide containing lithium (Li), manganese (Mn), nickel (Ni), and cobalt (Co),
the second cathode active material is a complex oxide containing lithium and at least one of nickel and cobalt,
the third cathode active material is at least a phosphorus oxide containing lithium and iron (Fe),
a ratio by the weight ratio of the cathode active materials is a value in the range obtained by joining each dot of A, B, C, and D expressed in Mathematical formula 1, where the first cathode active material is x, the second cathode active material is y, and the third cathode active material is z in a ternary diagram with the apexes set to each cathode active material, and Mathematical Formula 1 is:

$A(x,y,z)=(0.76,0.04,0.20)$ $B(x,y,z)=(0.94,0.05,0.01)$ $C(x,y,z)=(0.05,0.94,0.01)$ $D(x,y,z)=(0.04,0.76,0.20)$ (Mathematical formula 1).

2. The cathode material according to claim 1, wherein the first cathode active material contains a compound expressed in Chemical formula 1:

$Li_kMN_{(1-m-n-p)}Ni_mCo_nM2_pO_{(2-a1)}F_{b1}$, (Chemical formula 1)

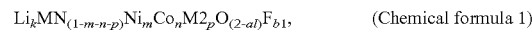

wherein, M1 represents at least one from the group consisting of magnesium (Mg), aluminum (Al), boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W); and values of k, m, n, p, a1, and b1 are in the range of $0.9 \leq k \leq 1.1$, $0.3 \leq m \leq 0.8$, $0 < n \leq 0.5$, $0 \leq p \leq 0.1$, $m+n+p<1$, $-0.1 \leq a1 \leq 0.2$, and $0 \leq b1 \leq 0.1$.

3. The cathode material according to claim 1, wherein the second cathode active material contains a compound expressed in Chemical formula 2:

$Li_qM2_{1-r}M3_rO_{(2-a2)}F_{b2}$, (Chemical formula 2)

wherein, M2 represents at least one of nickel and cobalt; M3 represents at least one from the group consisting of magnesium, aluminum, boron, titanium, vanadium, chromium, iron, copper, zinc, molybdenum, tin, calcium, strontium, and tungsten; and values of q, r, a2, and b2 are in the range of $0.9 \leq q \leq 1.1$, $0 \leq r \leq 0.1$, $-0.1 \leq a2 \leq 0.2$, and $0 \leq b2 \leq 0.1$.

4. The cathode material according to claim 1, wherein the third cathode active material contains at least one of a compound expressed in Chemical formula 3 and a compound expressed in Chemical formula 4:

$Li_sMn_{2-t}M4_tO_uF_{b3}$, (Chemical formula 3)

wherein, M4 represents at least one from the group consisting of cobalt, nickel, magnesium, aluminum, boron, titanium, vanadium, chromium, iron, copper, zinc, molybdenum, tin, calcium, strontium, and tungsten; and values of s, t, u, and b3 are in the range of $0.9 \leq s \leq 1.1$, $0 \leq t \leq 0.1$, $3.7 \leq u \leq 4.1$, and $0 \leq b3 \leq 0.1$; and $Li_vFe_{1-w}M5_wPO_4$, (Chemical formula 4)

wherein, M5 represents at least one from the group consisting of cobalt, manganese, nickel, magnesium, aluminum, boron, titanium, vanadium, niobium (Nb), copper, zinc, molybdenum, calcium, strontium, tungsten, and zirconium; and values of v and w are in the range of $0.9 \leq v \leq 1.1$ and $0 \leq w \leq 0.1$.

5. The cathode material according to claim 2, wherein in the compound expressed in Chemical formula 1, the value of m is in the range of $0.33 \leq m \leq 0.7$.

6. A battery comprising;
a cathode;
an anode; and
an electrolyte, wherein,
the cathode contains a first cathode active material, a second cathode active material, and a third cathode active material,
the first cathode active material is a complex oxide containing lithium (Li), manganese (Mn), nickel (Ni), and cobalt (Go),
the second cathode active material is a complex oxide containing lithium and at least one of nickel and cobalt,
the third cathode active material is at least and a phosphorus oxide containing lithium and iron (Fe),
a ratio by the weight ratio of the cathode active materials is a value in the range obtained by joining each dot of A, B, C, and D expressed in Mathematical formula 1, where the first cathode active material is x, the second cathode active material is y, and the third cathode active material is z in a ternary diagram with the apexes set to each cathode active material; and
Mathematical formula 1 is expressed as:

$A(x,y,z)=(0.76,0.04,0.20)$ $B(x,y,z)=(0.94,0.05,0.01)$ $C(x,y,z)=(0.05,0.94,0.01)$ $D(x,y,z)=(0.04,0.76,0.20)$  (Mathematical formula 1).

7. The battery according to claim 6, wherein the first cathode active material contains a compound expressed in Chemical formula 1:

$Li_kMn_{(1-m-n-p)}Ni_mCo_nM1_pO_{(2-a1)}F_{b1}$,  (Chemical formula 1)

wherein, M1 represents at least one from the group consisting of magnesium (Mg), aluminum (Al), boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W); and values of k, m, n, p, a1, and b1 are in the range of $0.9 \leq k \leq 1.1$, $0.3 \leq m \leq 0.8$, $0 < n \leq 0.5$, $0 \leq p \leq 0.1$, $m+n+p<1$, $-0.1 \leq a1 \leq 0.2$, and $0 \leq b1 \leq 0.1$.

8. The battery according to claim 6, wherein the second cathode active material contains a compound expressed in Chemical formula 2:

$Li_qM2_{1-r}M3_rO_{(2-a2)}F_{b2}$,  (Chemical formula 2)

wherein, M2 represents at least one of nickel and cobalt; M3 represents at least one from the group consisting of magnesium, aluminum, boron, titanium, vanadium, chromium, iron, copper, zinc, molybdenum, tin, calcium, strontium, and tungsten; and values of q, r, a2, and b2 are in the range of $0.9 \leq q \leq 1.1$, $0 \leq r \leq 0.1$, $-0.1 \leq a2 \leq 0.2$, and $0 \leq b2 \leq 0.1$.

9. The battery according to claim 6, wherein the third cathode active material contains at least one of a compound expressed in Chemical formula 3 and a compound expressed in Chemical formula 4:

$Li_sMn_{2-t}M4_tO_uF_{b3}$,  (Chemical formula 3)

wherein, M4 represents at least one from the group consisting of cobalt, nickel, magnesium, aluminum, boron, titanium, vanadium, chromium, iron, copper, zinc, molybdenum, tin, calcium, strontium, and tungsten; and values of s, t, u, and b3 are in the range of $0.9 \leq s \leq 1.1$, $0 \leq t \leq 0.1$, $3.7 \leq u \leq 4.1$, and $0 \leq b3 \leq 0.1$; and $Li_xFe_{1-w}M5_wPO_4$,  (Chemical formula 4)

wherein, M5 represents at least one from the group consisting of cobalt, manganese, nickel, magnesium, aluminum, boron, titanium, vanadium, niobium (Nb), copper, zinc, molybdenum, calcium, strontium, tungsten, and zirconium; and values of v and w are in the range of $0.9 \leq v \leq 1.1$ and $0 \leq w \leq 0.1$.

10. The battery according to claim 7, wherein in the compound expressed in Chemical formula 1, the value of m is in the range of $0.33 \leq m \leq 0.7$.

11. The battery according to claim 6 further comprising a film packaging member within which are contained:
the cathode;
the anode; and
the electrolyte.

* * * * *